(12) United States Patent
Fischer et al.

(10) Patent No.: US 6,565,150 B2
(45) Date of Patent: May 20, 2003

(54) ACTIVE HEADREST FOR A VEHICLE SEAT

(75) Inventors: Harald Fischer, Unterensingen (DE); Heiko Malsch, Heiningen (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/079,756

(22) Filed: Feb. 19, 2002

(65) Prior Publication Data
US 2002/0113483 A1 Aug. 22, 2002

Related U.S. Application Data
(60) Provisional application No. 60/269,923, filed on Feb. 19, 2001.

(51) Int. Cl.$^7$ .............................................. B60R 21/055
(52) U.S. Cl. ................................... 297/216.12; 297/408
(58) Field of Search ............................ 297/216.12, 408

Primary Examiner—Peter M. Cuomo
Assistant Examiner—Stephen D'Adamo
(74) Attorney, Agent, or Firm—Bill C. Panagos

(57) ABSTRACT

The present invention involves a pelvis activated vehicle seat and headrest assembly for rear impact of a vehicle. The vehicle seat includes a seatback frame and the headrest assembly includes a pelvis activated support assembly attached to the seatback frame. The seatback frame includes an upper cross member having two side members integrally and oppositely attached on either end of the upper cross member. The side members extend downwardly and are attached to each other by a lower cross member. The support assembly includes a reaction plate and an impact target. The impact target is pivotably attached proximate the bottom portion of the seatback frame. The reaction plate is pivotally attached to each side member by pivoting side links. The impact target is slidably connected to the reaction plate to move the headrest cushion to an actuated position forward and above a normal position.

5 Claims, 3 Drawing Sheets

ACTIVE HEADREST FOR A VEHICLE SEAT

CROSS-REFERENCE TO RELATED APPLICATIONS

This application claims the benefit of U.S. provisional application Serial No. 60/269,923 filed Feb. 19, 2001.

BACKGROUND OF THE INVENTION

1. Field of the Invention

The invention relates to a system for moving a headrest assembly of a vehicle seat upward and forward in the event of a rear impact.

2. Background Art

Improvements in safety mechanisms in the automotive industry continue to be made year after year. One example of such a safety mechanism includes a safety headrest as disclosed in U.S. Pat. No. 5,378,043. Headrests are provided to support the head of an occupant during a collision.

In a rear impact, a vehicle seat occupant may be driven rearwardly to exert a reaction force on the vehicle seat back. The pelvis and buttocks region of an occupant generally exerts more force initially on the seat back than the shoulder region of the occupant. This initial load applied by the pelvis and buttocks of the occupant may cause the seat back to be deflected rearwardly. As the seat back moves rearwardly, separation between the seat back and an occupant's head and torso may be increased.

In an attempt to solve this problem, active headrest mechanisms have been proposed in which the occupant's torso applies a rearward load or force to an impact target in the vehicle seat. The impact target is connected to a headrest cushion portion that moves forward upon application of a rearward load on the impact target. The cushion portion moves forward toward the head of the occupant to lessen the gap between the head of an occupant and the headrest cushion portion in a collision.

SUMMARY OF THE INVENTION

According to one aspect of the present invention, an improved vehicle seat and active headrest assembly combination is provided. The active headrest is activated by the application of a rearward pelvic load or force to the lower portion of a seat back by an occupant in a rear impact. The assembly includes a seatback frame and a dynamic headrest assembly support that moves the headrest in an upward and forward direction. The headrest assembly support includes a pivotal lower target that is oriented to be contacted by a seat occupant's pelvic region and a reaction plate to which the headrest assembly is secured that pivots and moves upwardly when the lower target is contacted.

The reaction plate is slidably attached to the upper end of the lower target and is attached to the sides of the seat back frame by pivoting links. Apertures formed on the reaction plate are aligned with holes formed on an upper cross member of the seat back frame. The apertures receive bushings that slidably receive a pair of headrest posts of the headrest assembly. The headrest posts extend through the holes in the upper cross member of the seat back frame and apertures in the reaction plate.

The headrest assembly is retained in a normal position generally in line with the seat back. Upon rear impact of the vehicle, the cushion portion of the headrest assembly is moved toward the head of the occupant to an actuated position that is raised and forward of the normal position to provide additional support to the head of the occupant sooner than if the headrest assembly were to remain fixed relative to the seat back. The cushion portion of the headrest assembly is moved toward the head of the occupant in response to the application of a rearward load by an occupant's pelvis on the lower target. As the upper portion of the lower target pivots rearwardly it applies a force to a lower portion of the reaction plate below a pivot axis of the linkage that connects the reaction plate to the seatback. The lower portion of the reaction plate shifts backwardly and upwardly. The upper portion of the reaction plate moves forwardly and upward carrying with it the headrest cushion.

DETAILED DESCRIPTION OF THE PREFERRED EMBODIMENTS

Figure 1:
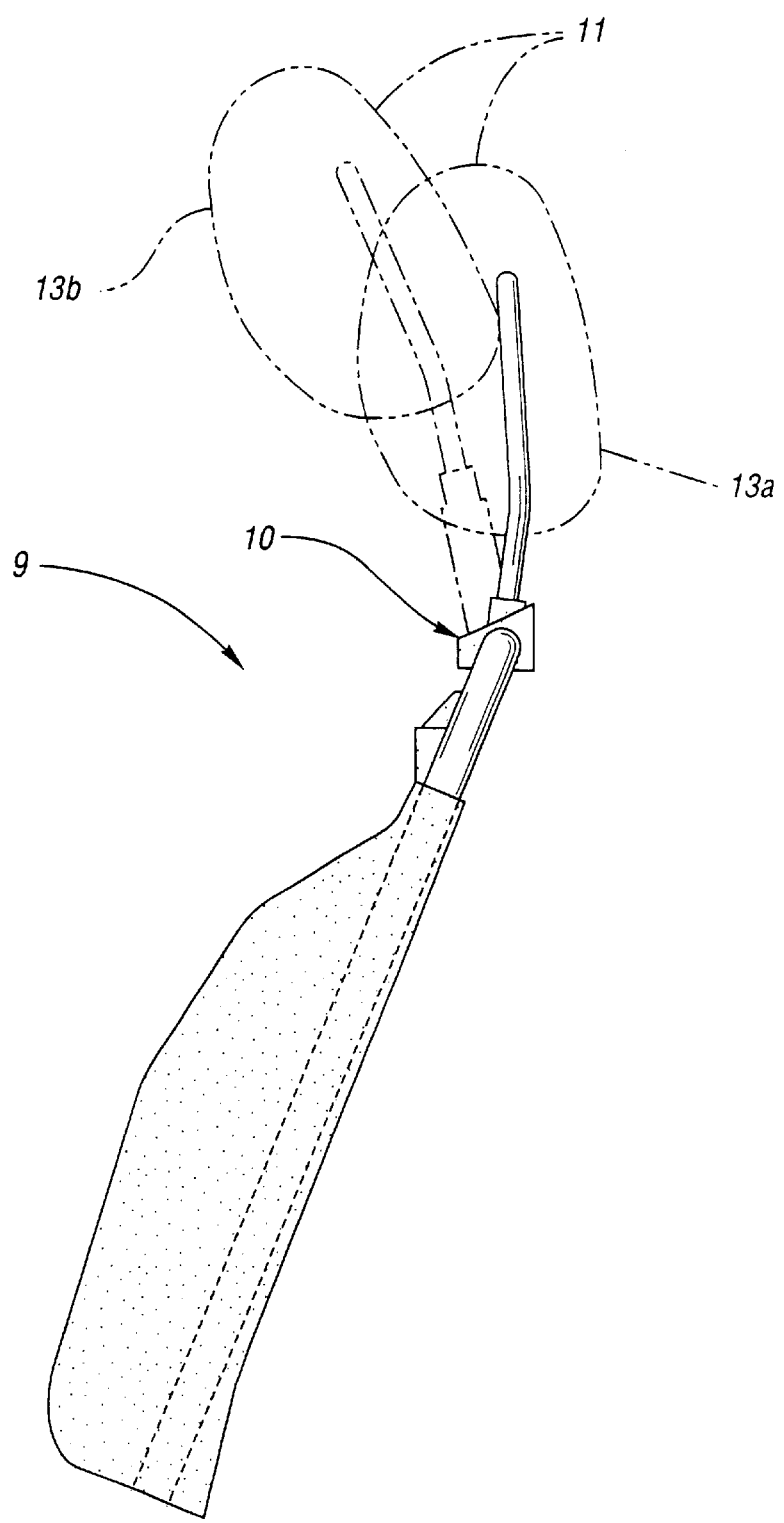
FIG. 1 is a side view depicting an operation of a headrest assembly in accordance with the present invention.

Referring now to FIG. 1, a vehicle seat 9 is shown in combination with a headrest assembly 10. A cushion portion 11 of assembly 10 is retained in a normal position 13a generally aligned with the seat back during normal vehicle operation. It should be understood that the headrest may be adjusted manually within a range of positions in accordance with the invention. Upon rear impact of the vehicle, the cushion portion 11 of the headrest assembly 10 moves to an actuated position 13b potentially providing support to the head of the occupant.

Figure 2:
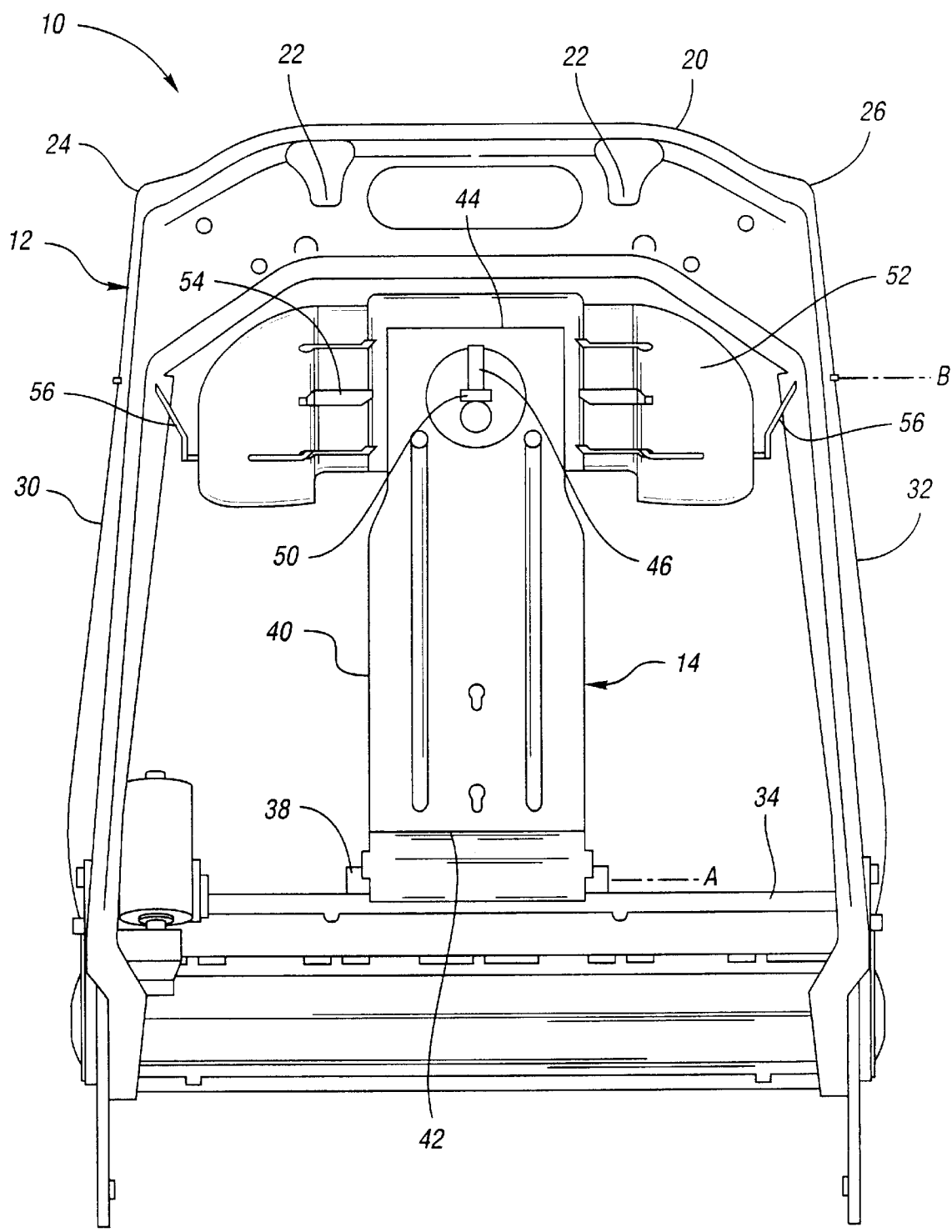
FIG. 2 is front view of a headrest assembly in accordance with the present invention.

Referring now to FIG. 2, a seat back frame 12 and pivotal support assembly generally referred to by reference numeral 14 are illustrated wherein the pivotal support assembly is movably attached to the seat back frame 12. Seatback frame 12 includes upper cross member 20 that has a plurality of holes 22 in which the headrest assembly is received. The upper cross member extends between two ends 24 and 26. Seatback frame 12 further includes side members 30 and 32 that may be integrally formed with upper cross member 20 and extend generally downwardly from the ends 24 and 26 of the upper cross member 20, respectively, and are connected on the lower ends to lower cross member 34. Lower cross member 34 may be attached to the side members 30, 32 by any suitable means or may be integrally formed in one piece.

Figure 3:
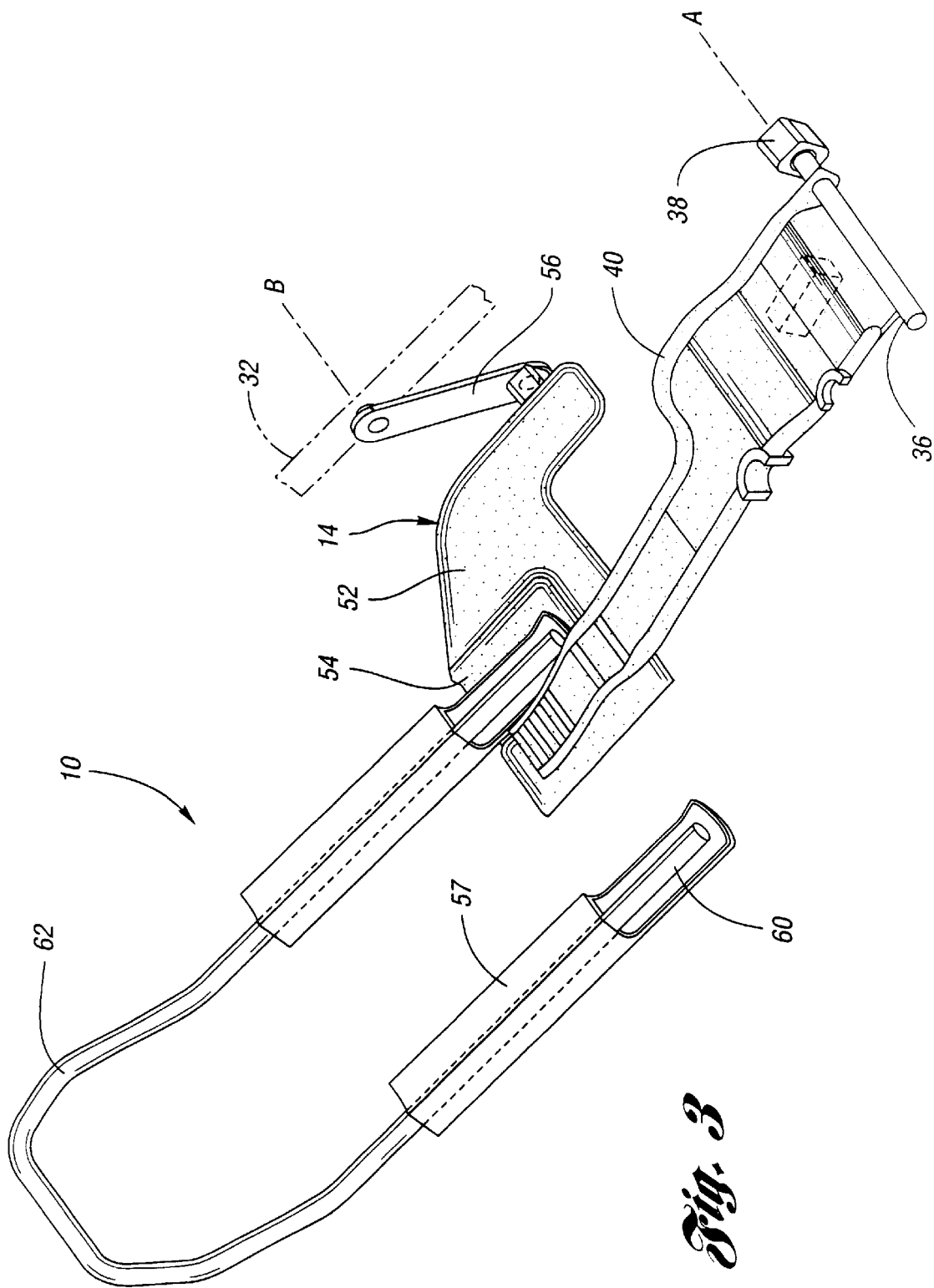
FIG. 3 is a fragmentary perspective view illustrating the headrest assembly, lower target and reaction plate attached to a seatback frame.

Referring now to FIGS. 2 and 3, the pivotal support assembly 14 includes lower target or impact target 40 and reaction plate 52 that is slidably attached to the impact target 40. Impact target 40 includes a lower end 42 and an upper end 44. Lower end 42 is pivotally attached to the top of lower cross member 34 at substantially the center thereof, such that impact target 40 may pivot about first pivot axis A. When a rearward force or load is directed toward the lower end 42, vertical impact target 40 pivots backwardly. More specifically, the rearward force may be directed to an area on vertical impact target 40 which encompasses lower end 42. However, the rearward force may also include an area on the impact target 40 above lower end 42 that will cause pivotal movement of impact target 40. Lower end 42 is pivotally attached to the top of lower cross member 34 by any suitable means to allow pivoting about first pivot axis A. As shown in FIG. 3, for example, bearings 38 may be disposed at the top of lower cross member 34 to receive a bar 36 that is secured to the lower end 42. In the illustrated embodiment, the lower end 42 pivots about the first axis A approximately 5–7 degrees but other ranges of motion could be provided depending upon design constraints.

Referring now to FIGS. 2 and 3, the impact target 40 further includes slot 46 near its upper end through which a latch 50 of reaction plate 52 is inserted to slidably attach reaction plate 52 to vertical impact target 40. Each of the right and left sides of reaction plate 52 includes a side link 56. Each side link 56 is pivotally attached to one of the side members 30, 32, thereby defining second pivot axis B. Side links 56 swing about pivot axis B to allow reaction plate 52 to pivot and move upwardly. Latch 50 inserts into slot 46 to allow upward sliding motion of reaction plate 52 relative to vertical impact target 40 as lower end 42 pivots about first pivot axis A. Thus, as vertical impact target 40 pivots about axis A, side links 56 pivot about axis B to allow reaction plate 52 to slide upwardly with the portion of the reaction plate below pivot axis B shifting rearwardly. A locking mechanism (not shown) may be incorporated to fix or lock the impact target 40 in an actuated position when target 40 pivots about first pivot axis A. The locking mechanism may comprise a conventional ratchet mechanism located adjacent headrest posts 57, bushings 60, or latch 50.

It should be understood that the length of the impact target 40 between lower end 42 and upper end 44 may vary. It has been found that as the distance between first pivot axis A and second pivot axis B increases, the corresponding movement of headrest frame 62 and cushion portion 11 will also increase.

Referring to FIGS. 2 and 3, the reaction plate 52 includes apertures 54 that are in alignment with the holes 22 in the upper cross member 20. In this embodiment, bushings 57 are disposed within apertures 54 to receive headrest post 60 of headrest frame 62. Bushings 57 are press fit or otherwise secured within the of apertures 54. Bushings 57 receive headrest posts 60 in a sliding relationship to facilitate adjusting the height of the headrest in its normal position. Each headrest post 60 is inserted through one of the holes 22 in the upper cross member 20 and is received in one of the bushings 57.

In the event of a relatively severe rear impact to a vehicle in which the vehicle seat 9 is disposed, the occupant's pelvis applies a rearward load onto lower end 42 of the impact target 40 causing it to pivot rearwardly about first pivot axis A. The pivotal movement of the impact target 40 causes reaction plate 52 to slide rearwardly and upwardly. More specifically, as the impact target 40 pivots about first axis A, latch 50 of reaction plate 52 slides upwardly along slot 46 of the impact target 40 and reaction plate 50 swings about second axis B on the side links 56. This is possible because side links 56 allow reaction plate 52 to pivot in the opposite direction to the direction of the impact target 40 and move upwardly as vertical impact target 40 applies a rearward load on the lower portion of the reaction plate. The movement of reaction plate 52, in turn, allows headrest frame 62 to be moved in an upward and forward direction.

In normal vehicle seat and headrest assemblies, during the initial stages of a rear impact, the occupant's torso is in contact with the seatback but the head is several inches forward of the cushion portion. This condition is consistent with the body being reclined at about 20° from vertical with the neck being approximately vertical. The head is usually not in contact with the cushion portion while driving. Depending upon the compliance of the seatback, the pelvic region or buttocks of a seat occupant compress into the cushion, while the head, neck, and torso move in unison. Typically, there is a greater compression in the buttocks region of the seat occupant, with a gradual reduction up to the shoulder level as the body remains upright. The more severe the crash, the greater the extent of the compression of the occupant into the seat. As this action is occurring, the initial load of the occupant may cause the seat to deflect rearwardly. The amount of deflection is related to the bending stiffness of the seat back. The seat back may deflect under the torso load prior to the time that the head and neck of the occupant contacts the cushion portion. In a conventional seat, a gap may develop between the head and the cushion portion in a rear impact collision.

In the present invention, the force of the occupant's pelvis against the impact target 40 causes the headrest assembly to move toward the vehicle occupant's head to minimize the gap between the occupant's head and the cushion portion 11. The greater the rear crash acceleration, the greater the resultant force exerted by the seat occupant, and the greater the forward movement of the cushion portion 11 toward the occupant's head.

As stated above, prior headrest assemblies are typically activated by contact with the upper torso or shoulder area of an occupant. We have found that locating an impact target of a headrest assembly near the pelvis of an occupant provides improved results. For example, it has been found that locating the impact target of the assembly adjacent the pelvis provides an earlier movement of the headrest towards the head of the occupant upon rear impact. Moreover, it has been found that greater distance of movement of the headrest results when the impact target is located near the pelvis rather than near the upper torso or shoulders of the occupant. In addition, it has been found that locating the impact target near the pelvis increases the force with which the headrest moves towards the head of the occupant. This results in improved support for the head of the occupant.

As depicted in FIG. 1, operation of the headrest assembly 10 provides a distance of movement of the cushion portion from a normal position to an actuated position. The distance has been found to be greater than the distance of movement of a typical headrest assembly having an impact target activated by the shoulder region of an occupant. In the present invention, results have shown that the distance traveled by the pelvis compared to the distance moved by the headrest cushion may be at a ratio of 1:3 to a ratio of 1:5. The transmission ratio may be adjusted simply by adjusting the length of the lower target and/or the distance between the first pivot axis A and the area where the reaction plate slides on the vertical impact target. The resulting force placed upon the headrest will vary depending on the force applied to the lower end of the impact target.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat and an active headrest system, in combination, the vehicle seat having a seat back having a frame, the active headrest system comprising:

a headrest cushion;

at least one headrest post extending from the headrest cushion and into an interior portion of the seat back;

a reaction plate connected to an upper portion of the frame of the seat back by a pair of pivoting links, each of the pivoting links being pivotally connected to the frame at spaced locations and also being pivotally connected to the reaction plate, the headrest post being secured to the reaction plate; and an impact target pivotally secured to proximate a bottom portion of the seat back and extending to the reaction plate, wherein the impact target has an upper end that is adapted to contact the reaction plate in a sliding relationship, wherein upon application of a force exceeding a predetermined level on the impact target by a person sitting in the vehicle seat, the impact target pivots in a first direction that causes the reaction plate, headrest cushion and headrest post to swing upwardly and forward on the pivoting links in a second direction generally opposite the first direction, raising and rotating the headrest cushion to move the headrest cushion toward a head of a person sitting in the vehicle seat.

2. A vehicle seat and an active headrest system, in combination, the vehicle seat having a seat back having a frame, the active headrest system comprising:

a headrest cushion;

at least one headrest post extending from the headrest cushion and into an interior portion of the seat back;

a reaction plate connected to an upper portion of the frame of the seat back by a pair of pivoting links, each of the pivoting links being pivotally connected to the frame at spaced locations and also being pivotally connected to the reaction plate, the headrest post being secured to the reaction plate; and an impact target pivotally secured to proximate a bottom portion of the seat back and extending to the reaction plate, a slot formed in the impact target and a latch formed on the reaction plate that is received in the slot of the impact target, wherein upon application of a force exceeding a predetermined level on the impact target by a person sitting in the vehicle seat, the impact target pivots in a first direction that causes the reaction plate, headrest cushion and headrest post to swing upwardly and forward on the pivoting links in a second direction generally opposite the first direction, raising and rotating the headrest cushion to move the headrest cushion toward a head of a person sitting in the vehicle seat.

3. A vehicle seat and an active headrest system, in combination, the vehicle seat having a seat back having a frame, the active headrest system comprising:

a headrest cushion;

at least one headrest post extending from the headrest cushion and into an interior portion of the seat back;

a reaction plate connected to an upper portion of the frame of the seat back by a pair of pivoting links, each of the pivoting links being pivotally connected to the frame at spaced locations and also being pivotally connected to the reaction plate, the headrest post being secured to the reaction plate;

a pair of bushings being provided on the reaction plate which receive a pair of headrest posts in a sliding relationship; and an impact target pivotally secured to proximate a bottom portion of the seat back and extending to the reaction plate, wherein upon application of a force exceeding a predetermined level on the impact target by a person sitting in the vehicle seat, the impact target pivots in a first direction that causes the reaction plate, headrest cushion and headrest post to swing upwardly and forward on the pivoting links in a second direction generally opposite the first direction, raising and rotating the headrest cushion to move the headrest cushion toward a head of a person sitting in the vehicle seat.

4. A vehicle seat and an active headrest system, in combination, the vehicle seat having a seat back having a frame, the active headrest system comprising:

a headrest cushion;

at least one headrest post extending from the headrest cushion and into an interior portion of the seat back;

a reaction plate connected to an upper portion of the frame of the seat back by a pair of pivoting links, each of the pivoting links being pivotally connected to the frame at spaced locations and also being pivotally connected to the reaction plate, the headrest post being secured to the reaction plate; and an impact target pivotally secured to proximate a bottom portion of the seat back and extending to the reaction plate, wherein the impact target is pivotally connected proximate the bottom portion of the seat back at an axis A, the pivoting links are pivotal about an axis B corresponding to the location that the pivoting links are connected to the frame, and the impact target contacts a portion of the reaction plate that is below the axis B, wherein upon application of a force exceeding a predetermined level on the impact target by a person sitting in the vehicle seat, the impact target pivots in a first direction that causes the reaction plate, headrest cushion and headrest post to swing upwardly and forward on the pivoting links in a second direction generally opposite the first direction, raising and rotating the headrest cushion to move the headrest cushion toward a head of a person sitting in the vehicle seat.

5. The combination of claim 4 wherein the headrest cushion has a normal position and an actuated position to which the headrest cushion is shifted after a rear impact collision of a predetermined magnitude, the actuated position being forward and above the normal position.

* * * * *